United States Patent Office 3,228,997
Patented Jan. 11, 1966

3,228,997
PEARLESCENT POLYESTER COMPOSITIONS
Gerald M. Armstrong, Gordon C. Newland, and John W. Tamblyn, Kingsport, Tenn., assignors to Eastman Kodak Company, Rochester, N.Y., a corporation of New Jersey
No Drawing. Filed Feb. 8, 1961, Ser. No. 87,769
10 Claims. (Cl. 260—860)

This invention relates to a process for the production of polyester biphase plastic compositions and more particularly to compositions of this type which have a pearlescent appearance, especially when extruded in the form of sheets, films, and the like. The process and product of this invention are particularly characterized by the fact that no pigments, pearl essence or other materials usually employed for producing nacreous effects in plastics are used in obtaining the pearlescent appearance of the product, this effect being obtained solely by virtue of the physical and chemical nature of the polyester or copolyester material employed and the conditions under which the product is produced.

It is known to produce plastic products from two different polymeric plastic materials by dissolving a copolymer of isobutylene and isoprene in monomeric styrene, polymerizing the styrene-copolymer solution or mixture by extended heating, then comminuting and injection molding the resulting composition. Such a process is disclosed in the Fordham U.S. Patent 2,817,118 and the product is said to have a pearlescent appearance. No reference is made in this patent to the employment of any type of polyester or copolyester material and the pearlescent effect is apparently obtained by the polymerization in situ of the styrene under the critical conditions specified and the subsequent injection molding of the product of the polymerization.

In the Goessling U.S. Patent 2,353,437, there is disclosed a process of producing a laminated or stratified plastic sheet product by mixing one clear plastic and one translucent plastic and subjecting the mixture to heat and pressure. It is said that a product having a stratified pearlescent appearance may be produced in this manner by mixing a molding powder of styrene (vinyl benzene) and a molding powder of Lucite (methyl methacrylate) in substantially equal quantities, feeding the mixture to an injection molding machine of conventional design and extruding the resulting mixture under heat and pressure to form a sheet material.

It is also known from the disclosure of U.S. Patent 2,623,031 to produce elastomers, which may be formed into sheets, films and fibers having a high degree of extensibility and elastic recovery, from critical mixtures of certain polyesters and copolyesters. There is, however, no reference in this disclosure to the production of any type of pearlescent effect in the products thus produced.

It is an object of this invention to provide a process of producing a biphase plastic product having a pearlescent appearance without the use of pigments, pearl essence or other substances generally employed to produce such effects.

Another object is to provide a process for making biphase polyester plastic products which is simple to operate and avoids the complicated control and techniques usually necessary in the production of pearlescent plastic material.

Another object is to provide a process of producing polyester plastic products having a pearlescent appearance from materials which may be readily employed and used by a manufacturer of such products.

Another object is to provide a new and improved biphase polyester plastic composition having a pearlescent appearance.

A further object is to provide a new and improved biphase polyester plastic product in the form of sheets, films and other products having a pearlescent appearance.

Another object is to provide biphase polyester products having a pleasing pearlescent appearance without the use of pigments, pearl essence or other nacreous substances.

Other objects will appear hereinafter.

These objects are accomplished by the following invention which, in its broader aspects, comprises mixing two or more linear polyesters of relatively high-melting points one of which may be a copolyester, which polyesters are incompatible (insoluble or immiscible with each other), in powder or granular form, in which mixture one of the polyesters is in greater proportion than the other, and thereafter, subjecting the mixture to a molding operation under the influence of heat whereby the polyester particles are melted and caused to flow. One convenient way of producing the required flow is by running the mixture through a conventional extrusion molding machine provided with heating means to melt the material and with means, such as a screw, to force the material from the machine and through an appropriate forming die. Under these conditions, one of the polyesters forms a matrix of plastic material in which the other molten polyester material is distributed in randomly disposed discrete particles, masses, streams or irregular strata or other forms to produce in the product a pearlescent appearance.

The polyesters employed in accordance with our invention may be prepared in accordance with known procedures. In general, we have found that polyesters derived from 4,4′,p,p′-sulfonyl dibenzoic acid and a glycol such as 1,5-pentanediol or 1,4-butanediol are especially efficacious in producing the new pearlescent products of our invention. Such polyesters may be prepared in accordance with the disclosure of the U.S. Patents to Caldwell 2,744,089 and 2,744,097. For the second or other component of the mixture of polyesters above referred to, we may employ a copolyester having the required property of incompatibility with the first polyester material, for example, a copolyester produced by reacting a glycol such as 1,4-butanediol with two different acids such as 4,4′-sulfonyl dibenzoic acid and an aliphatic diabasic acid such as azelaic acid, adipic acid, glutaric acid, etc. The preparation of copolyesters of this type are disclosed in U.S. Patents to Caldwell 2,744,088 and 2,744,091. In view of the fact that the preparation and characteristics of both of these two types of polyesters are well-known to those skilled in the art, no further detail description of their preparation need be given.

Reference has been made above in the general statement of our invention to the fact that the copolyester material is employed in powder or granular form. To obtain the best results, the materials which are solids at room temperature should be comminuted, as by grinding or other conventional comminuting operation, to such a degree of fineness as to pass a 10–30 mesh screen. In general, we prefer that the material be of such a degree of fineness as to pass a 20 mesh screen.

Reference has also been made to the mixing, melting and flowing of the mixture of comminuted polyester material in producing the pearlescent product of our invention. This operation may be accomplished by an conventional procedure which will cause the material to melt and flow. Under such conditions and in accordance with the invention, the material is subjected to such a degree of heat as will bring about melting of both polyester components in the mixture. In employing the polyester material referred to above, the mixture is subjected to a temperature slightly above the melting point of the highest melting polyester or copolyester component of the mix. As previously indicated, the melting and flowing of the material is conveniently accomplished by depositing the comminuted mixture in the hopper of a conventional extrusion molding machine and subjecting it to an elevated temperature of the order of about 288° C. The particular temperature employed will, of course, depend upon the particular polyester or copolyester material selected for making up the mix since each polyester or copolyester has its own individual melting point or melting range. Regardless of the particular product being formed, whether in sheet or other form, it is necessary that the plastic material must be melted and caused to flow in order to obtain the pearlescent effect. The molten material is then extruded from the machine through a die having an orifice giving the product the desired shape as, for example, a flat sheet, a rod, a tube or the like. When making a sheet material, it is generally desirable to extrude the molten material onto the surface of a casting wheel in order to facilitate formation of the sheet and provide means for conveniently handling the material.

If desired, various natural or synthetic dyes may be used to produce a colored pearlescent plastic product in accordance with our invention. This can be done by adding the color to the mix before the melting and flowing operation. In some cases, it may be desired to employ a polyester or copolyester which has been previously colored with suitable colorants such as transparent dyes. In other cases, both of the components of the mixture may be precolored with such dyes prior to grinding and mixing to produce in the product variegated effect. In general, pigments should not be employed in the matrix as this obscures or tends to obscure the pearlescent effect which is produced by the striated, stratified or particulate material of the second component.

In the following examples and description, we have set forth several of the preferred embodiments of our invention, but they are included merely for purposes of illustration and not as a limitation thereof.

*Example 1*

72 parts by weight of a polyester solid at room temperature and obtained by the interaction of 4,4'-sulfonyl dibenzoic acid and 1,5-pentanediol was ground to a powder such that it would pass a 20 mesh screen. This powder was mixed with 28 parts by weight of a 20 mesh powder of a copolyester obtained by reacting 30 mole percent of azelaic acid, 20 mole percent 4,4'-sulfonyl dibenzoic acid and 50 mole percent 1,4-butanediol. The mixed comminuted material was then fed into the hopper of a standard extrusion molding machine provided with heating means and a screw stuffer. As the material passed through the machine, it was subjected to a temperature of approximately 288° C., thereby causing both components of the mixture to melt and flow. The molten material was extruded from the machine through a dye with a flat rectangular orifice in the form of a sheet which was then conveyed to the surface of a chrome plated steel roll maintained at a surface temperature of 65° C. The sheet material thus produced had a very pleasing pearlescent appearance.

In repeating the above procedure, products having observable pearlescent effects were obtained when 5-40% by weight of the copolyester was employed in the mix, although the best results were obtained within the range of 20-35% and maximum effects at 28% of the copolyester.

*Example 2*

A polyester solid at room temperature and produced from equimolar amounts of 4,4'-sulfonyl dibenzoic acid and 1,5-pentanediol was comminuted to pass a 20 mesh screen. 67 parts of the comminuted material was added to 33 parts by weight of a similarly comminuted copolyester containing 30 mole percent azelaic acid, 20 mole percent 4,4'-sulfonyl dibenzoic acid and 50 mole percent 1,5-pentanediol was melted and extruded as in Example 1. A sheet material having a pleasing pearlescent appearance was obtained. A maximum pearlescent effect was obtained when the material contained approximately 33% by weight of the copolyester, although pearlescent products are also obtained within the range of 25-40% of the copolyester material.

*Example 3*

As illustrating the fact that the product of a pearlescent copolyester material, in accordance with our invention, depends upon certain critical factors, namely, the proportions of the ingredients of the polyester mix and the chemical nature of the material, three polyester compositions, each having the same overall average chemical makeup namely, 41.5 mole percent 4,4'-sulfonyl dibenzoic acid, 8.5 mole percent azelaic acid and 50 mole percent 1,5-pentanediol were prepared as follows:

(1) A mixture of 71.7% (by weight) of a polyester made from 4,4'-sulfonyl dibenzoic acid and 1,5-pentanediol with 28.3% (by weight) of a copolyester made from 30 mole percent azelaic acid, 20 mole percent 4,4'-sulfonyl dibenzoic acid and 50 mole percent 1,5-pentanediol.

(2) A mixture of 49.3% (by weight) of a polyester made from 4,4'-sulfonyl dibenzoic acid and 1,5-pentanediol with 50.7% (by weight) of a copolyester made from 33.5 mole percent 4,4'-sulfonyl dibenzoic acid, 16.5 mole percent azelaic acid and 50 mole percent 1,5-pentanediol.

(3) A copolyester made from 41.5 mole percent 4,4'-sulfonyl dibenzoic acid, 8.5 mole percent azelaic acid and 50 mole percent 1,5-pentanediol.

On heating and extrusion as outlined above, composition (1) gave a film with a pronounced and pleasing pearlescent appearance, composition (2) gave a translucent film without pearlescence while composition (3) gave a transparent film without pearlescent appearance. Interesting differences were also observed in the mechanical properties of the three films. For example, the elongations at break of compositions (1), (2) and (3) were, respectively 350%, 19% and 6%.

It will be observed from this example and from the two preceding examples that the obtaining of a pearlescent product in accordance with our invention, depends upon the particular combination of polyesters employed. In other words, only certain polyesters or copolyesters and in certain specific proportions will serve to bring out the pearlescent effect. The salient and critical features of our invention may thus be summarized broadly as follows:

(1) The polyester making up the matrix is a polyester derived from 4,4'-sulfonyl dibenzoic acid and a diol such as 1,5-pentanediol, (2) The other immiscible or insoluble component is a copolyester derived from 4,4'-sulfonyl dibenzoic acid, an aliphatic dibasic acid of 4-10 carbon atoms, such as azelaic acid and a diol such as 1,4-butanediol or 1,5-pentanediol, (3) The second component must be in an amount corresponding to 5-40% by weight of the total composition, (4) The material must be subjected to a sufficient degree of heat to cause melting of the highest melting polyester component of the comminuted polyester mix and (5) The material must then be caused to flow as by extrusion molding or similar means. As indicated above, especially good results are obtained by employing a copolyester mix containing 80-65% by weight of a polyester derived from 4,4'-sulfonyl dibenzoic acid and 1,5-pentanediol and 20-35% by weight of a copolyester derived from 4,4'-sulfonyl dibenzoic acid, azelaic acid and 1,4-butanediol and particularly such a composition containing 28% by weight of the latter component. Similarly, especially desirable pearlescent products are obtained by employing a composition containing 75-60% by weight of a polyester derived from 4,4'-sulfonyl dibenzoic acid and 1,5-pentanediol and 25-40% of a copolyester derived from 4,4'-sulfonyl dibenzoic acid, azelaic acid and 1,5-pentanediol and especially such a composition containing 33% of the latter component.

The pearlescent plastic product of our invention can be used in a wide variety of applications. For example, pearlescent polyester sheets produced in accordance with the invention may be employed as decorative materials, wrapping materials, book covers and, in the appropriate thickness, may be employed in the manufacture of containers of many different kinds. The material may also be used as decorative paneling or may be laminated to a base such as paper, cardboard, plywood, sheet metal and the like to produce products useful in various industrial applications. The pearlescent plastic polyester material may also be extruded in the form of tubes, rods and the like or may be formed into any type of desired object by injection molding or other well-known molding processes.

Although the invention has been described in considerable detail with particular reference to certain preferred embodiments thereof, variations and modifications can be effected within the spirit and scope of the invention as described hereinabove, and as defined in the appended claims.

We claim:

1. A process of producing a biphase polyester plastic product having a pearlescent appearance which comprises forming a comminuted mixture containing 95–60% by weight of a polyester consisting of the condensation product of 4,4'-sulfonyl dibenzoic acid with a dioxy compound selected from the class consisting of 1,4-butane diol and 1,5-pentane diol and 5–40% by weight of a copolyester consisting of the condensation product of 4,4'-sulfonyl dibenzoic acid, and aliphatic dicarboxylic acid of 4–10 carbon atoms and a diol selected from the class consisting of 1,4-butane diol and 1,5-pentane diol, heating the mixture to the melting point of the highest melting condensation product material and causing the molten material to flow.

2. A process of producing a biphase polyester plastic product having a pearlescent appearance which comprises forming a comminuted mixture containing 95–60% by weight of a polyester consisting of the condensation product of 4,4'-sulfonyl dibenzoic acid with 1,5-pentane diol and 5–40% by weight of a copolyester consisting of the condensation product of 4,4'-sulfonyl dibenzoic acid, an aliphatic dicarboxylic acid of 4–10 carbon atoms and a diol selected from the class consisting of 1,4-butane diol and 1,5-pentane diol, heating the mixture to the melting point of the highest melting condensation product material and causing the molten material to flow.

3. A process of producing a biphase polyester plastic product having a pearlescent appearance which comprises forming a comminuted mixture containing 95–60% by weight of a polyester consisting of the condensation product of 4,4'-sulfonyl dibenzoic acid with 1,5-pentane diol and 5–40% by weight of a copolyester consisting of the condensation product of 4,4'-sulfonyl dibenzoic acid, azelaic acid and a diol selected from the class consisting of 1,4-butane diol and 1,5-pentane diol, heating the mixture to the melting point of the highest melting condensation product material and causing the molten mixture to flow.

4. A process of producing a biphase polyester plastic product having a pearlescent appearance which comprises forming a comminuted mixture containing 95–60% by weight of a polyester consisting of the condensation product of 4,4'-sulfonyl dibenzoic acid with 1,5-pentane diol and 5–40% by weight of a copolyester consisting of the condensation product of 4,4'-sulfonyl dibenzoic acid, azelaic acid and 1,4-butane diol, heating the mixture to the melting point of the highest melting condensation material and causing the molten mixture to flow.

5. A process of producing a biphase polyester plastic product having a pearlescent appearance which comprises forming a comminuted mixture containing 95–60% by weight of a polyester consisting of the condensation product of 4,4'-sulfonyl dibenzoic acid with 1,5-pentane diol and 5–40% by weight of a copolyester consisting of the condensation product of 4,4'-sulfonyl dibenzoic acid, azelaic acid and 1,5-pentane diol, heating the mixture to the melting point of the highest melting condensation material and causing the molten mixture to flow.

6. A process of producing a biphase polyester plastic product having a pearlescent appearance which comprises forming a comminuted mixture containing 88–65% by weight of a polyester consisting of the condensation product of equal mole percentages of 4,4'-sulfonyl dibenzoic acid and 1,5-pentane diol and 20–35% by weight of a copolyester consisting of the condensation product of 20 mole percent 4,4'-sulfonyl dibenzoic acid, 30 mole percent azelaic acid and 50 mole percent 1,4-butane diol, heating the mixture to the melting point of the highest melting condensation product material and causing the molten material to flow.

7. A process of producing a biphase polyester plastic product having a pearlescent appearance which comprises forming a comminuted mixture containing 72 percent by weight of a polyester consisting of the condensation product of equal mole percentages of 4,4'-sulfonyl dibenzoic acid and 1,5-pentane diol and 28 percent by weight of a copolyester consisting of the condensation product of 20 mole percent 4,4'-sulfonyl dibenzoic acid, 30 mole percent azelaic acid and 50 mole percent 1,4-butane diol, heating the mixture to the melting point of the highest melting condensation product material and causing the molten material to flow.

8. A process of producing a biphase polyester plastic product having a pearlescent appearance which comprises forming a comminuted mixture containing 75–60 percent by weight of a polyester consisting of the condensation product of equal mole percentages of 4,4'-sulfonyl dibenzoic acid and 1,5-pentane diol and 25–40% by weight of a copolyester consisting of the condensation product of 20 mole percent 4,4'-sulfonyl dibenzoic acid, 30 mole percent azelaic acid and 50 mole percent 1,5-pentane diol, heating the mixture to the melting point of the highest polyester material and causing the molten mixture to flow.

9. A process of producing a biphase polyester plastic product having a pearlescent appearance which comprises forming a comminuted mixture containing 67% by weight of a polyester consisting of the condensation product of equal mole percentages of 4,4'-sulfonyl dibenzoic acid and 1,5-pentane diol and 33% by weight of a copolyester consisting of the condensation product of 20 mole percent 4,4'-sulfonyl dibenzoic acid, 30 mole percent azelaic acid and 50 mole percent 1,5-pentane diol, heating the mixture to the melting point of the highest polyester material and causing the molten mixture to flow.

10. The pearlescent plastic product of claim 2.

References Cited by the Examiner

UNITED STATES PATENTS

| | | | |
|---|---|---|---|
| 2,353,457 | 7/1944 | Goessling | 18—55 |
| 2,364,024 | 11/1944 | Hayes | 18—55 |
| 2,377,231 | 5/1945 | Hayes | 18—55 |
| 2,744,089 | 5/1956 | Caldwell | 260—755 |
| 2,744,091 | 5/1956 | Caldwell | 260—755 |
| 2,996,474 | 8/1961 | Voigt | 260—30.6 |

MURRAY TILLMAN, *Primary Examiner.*

DANNY ARNOLD, LEON J. BERCOVITZ, WILLIAM H. SHORT, *Examiners.*